US012573074B2

(12) United States Patent
Ikeda

(10) Patent No.: US 12,573,074 B2
(45) Date of Patent: Mar. 10, 2026

(54) MACHINE LEARNING METHOD, MACHINE LEARNING SYSTEM, AND PROGRAM

(71) Applicant: TOYOTA JIDOSHA KABUSHIKI KAISHA, Toyota (JP)

(72) Inventor: Takuya Ikeda, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 18/186,483

(22) Filed: Mar. 20, 2023

(65) Prior Publication Data

US 2023/0368410 A1     Nov. 16, 2023

(30) Foreign Application Priority Data

May 16, 2022     (JP) ................................. 2022-080200

(51) Int. Cl.
*G06T 7/70* (2017.01)
*G06V 10/774* (2022.01)

(52) U.S. Cl.
CPC .............. *G06T 7/70* (2017.01); *G06V 10/774* (2022.01); *G06T 2207/20081* (2013.01); *G06T 2207/20212* (2013.01); *G06T 2207/30242* (2013.01)

(58) Field of Classification Search
CPC ............. G06T 7/70; G06T 2207/20081; G06T 2207/20212; G06T 2207/30242; G06V 10/774; G06V 10/764; G06N 3/0475; G06N 3/09; G06N 20/00
USPC ........................................................ 382/159
See application file for complete search history.

(56) References Cited

U.S. PATENT DOCUMENTS

| | | | |
|---|---|---|---|
| 2019/0304065 A1 | 10/2019 | Bousmalis et al. | |
| 2020/0160178 A1* | 5/2020 | Kar ........................ | G06V 10/82 |
| 2020/0372681 A1 | 11/2020 | Kado | |
| 2021/0064859 A1 | 3/2021 | Muramatsu | |

(Continued)

FOREIGN PATENT DOCUMENTS

| | | |
|---|---|---|
| JP | 2020-502665 A | 1/2020 |
| JP | 2020-24672 A | 2/2020 |
| JP | 2020-144411 A | 9/2020 |

(Continued)

OTHER PUBLICATIONS

Takeru Ooba et al., "Image Composition Using Semi-Supervised Learning for Instance Segmentation", IPSJ SIG Technical Report, 2019, vol. 2019-CVIM-217, No. 30, pp. 1-8 (13 pages total).

(Continued)

*Primary Examiner* — Stephen P Coleman
(74) *Attorney, Agent, or Firm* — Sughrue Mion, PLLC

(57) ABSTRACT

A machine learning method according to this embodiment trains a recognizer using a composite image, acquires a labeled real image based on an image captured by a sensor, stores, when at least one of the results of the recognition when the labeled real image is input to the recognizer match the label, results of the recognition performed by the recognizer, performs machine learning using a data set group including a plurality of the data sets, a real image and a composite image forming a pair in each of the data sets, thereby generating an image transformer, generating a labeled real image as a result of the image transformer transforming the composite image into the real image, and trains the recognizer based on the labeled real image.

15 Claims, 5 Drawing Sheets

(56)                    References Cited

U.S. PATENT DOCUMENTS

2021/0142484 A1      5/2021   Yamamoto

FOREIGN PATENT DOCUMENTS

| | | |
|---|---|---|
| JP | 2020-149086 A | 9/2020 |
| JP | 2020-190950 A | 11/2020 |
| JP | 2021-039424 A | 3/2021 |
| WO | 2021/038678 A1 | 3/2021 |

OTHER PUBLICATIONS

Jun-Yan Zhu et al., "Unpaired Image-to-Image Translation using Cycle-Consistent Adversarial Networks", IEEE International Conference on Computer Vision (ICCV), 2017, 10 pages, https://junyanz.github.io/CycleGAN/.
Hsin-Ying Lee et al., "DRIT++: Diverse Image-to-Image Translation via Disentangled Representations", arXiv:1905.01270v2 [cs. CV] Dec. 17, 2019, pp. 1-16.

* cited by examiner

1

REAL IMAGE
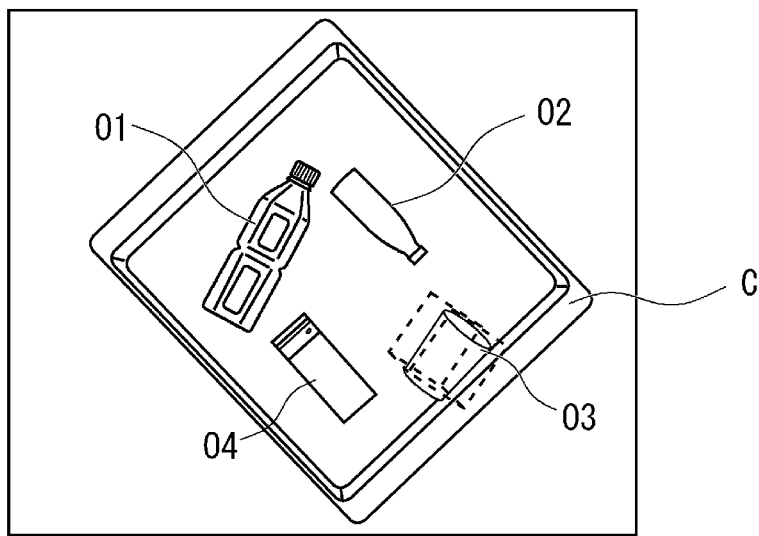
COMPOSITE IMAGE
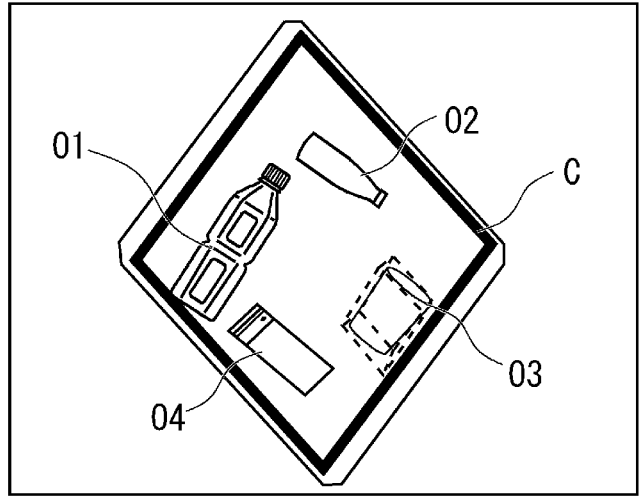
F i g.  3

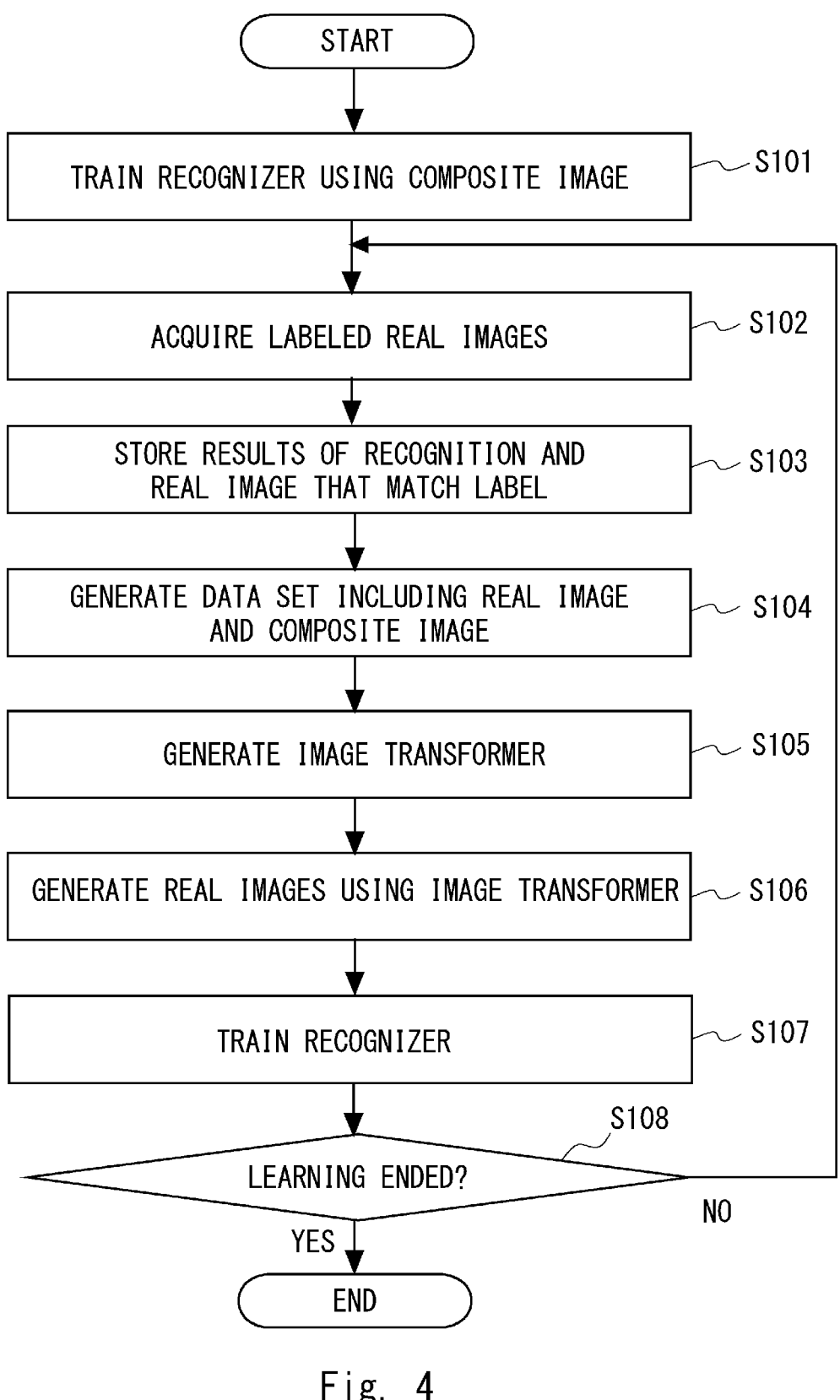
F i g.  4

MACHINE LEARNING METHOD, MACHINE LEARNING SYSTEM, AND PROGRAM

CROSS REFERENCE TO RELATED APPLICATIONS

This application is based upon and claims the benefit of priority from Japanese patent application No. 2022-080200, filed on May 16, 2022, the disclosure of which is incorporated herein in its entirety by reference.

BACKGROUND

The present disclosure relates to a machine learning method, a machine learning system, and a program.

Patent Literature 1 (Japanese Unexamined Patent Application Publication No. 2020-190950) discloses a method for generating learning data to be used for an identification model. In Patent Literature 1, a processor performs trapezoid correction on a background image that does not include a detection target. The processor generates a composite image by superimposing the detection target image on the background image subjected to the trapezoid correction. The processor further generates learning data based on the composite image and the label information.

SUMMARY

Recognizers generated by machine learning have been producing results. In order to generate a recognizer with a high recognition accuracy, it is required to efficiently collect learning data. The learning data includes image data in a simulation domain such as CG or image data in a real domain captured by a camera. As to the image data in the simulation domain, it is easy to generate this data in the simulation domain, but it is difficult to improve the accuracy of the recognition. As the image data in the real domain, the cost for collecting data and the cost for labeling are large. It has therefore been required to provide a machine learning method that is inexpensive and capable of generating a highly accurate recognizer in a simple manner.

The present disclosure has been made in order to solve the aforementioned problem, and provides a machine learning method, a machine learning system, and a program capable of generating a highly accurate recognizer in a simple manner.

A machine learning method according to this embodiment includes: (1) training a recognizer that recognizes object information including a position and a posture of an object using a composite image of the object; (2) acquiring a labeled real image based on a captured image of the object captured by an image sensor; (3) storing, when at least one of results of the recognition when the labeled real image is input to the recognizer match the label, the real image and the results of the recognition performed by the recognizer; (4) generating a composite image using the results of the recognition performed by the recognizer, thereby generating a data set in which the real image and the composite image form a pair; (5) performing machine learning using a data set group including a plurality of the data sets, thereby generating an image transformer that transforms a composite image into a real image; (6) generating a labeled real image as a result of the image transformer transforming the composite image into the real image; and (7) training the recognizer based on the labeled real image.

In the aforementioned machine learning method, the image transformer may be a machine learning model that uses the real image as a first domain and the composite image as a second domain and is able to transform between the first domain and the second domain.

In the aforementioned machine learning method, the recognizer may be re-learned by repeating processing of (2)-(6) until the recognizer reaches a desired performance.

In the aforementioned machine learning method, a composite image generator capable of generating a composite image by changing the position and the posture of the object may be used in (4), and the composite image generator may generate a composite image of the object in such a way that the position and the posture of the composite image match the position and the posture obtained in the results of the recognition in (2).

In the aforementioned machine learning method, in (1), a composite image generated by the composite image generator may be used.

In the aforementioned machine learning method, in (6), a composite image of an object in a position and a posture that are different from the position and the posture that have been recognized when the captured image is input to the recognizer as a labeled real image may be transformed into a real image.

In the aforementioned machine learning method, the label of the captured image may show the number of objects or the number of objects for each category of objects.

A machine learning method according to this embodiment is a machine learning system including at least one processor, in which the processor performs the following processing of: (1) training a recognizer that recognizes object information including a position and a posture of an object using a composite image of the object; (2) acquiring a labeled real image based on a captured image of the object captured by an image sensor; (3) storing, when at least one of results of the recognition when the labeled real image is input to the recognizer match the label, the real image and the results of the recognition performed by the recognizer; (4) generating a composite image using the results of the recognition performed by the recognizer, thereby generating a data set in which the real image and the composite image form a pair; (5) performing machine learning using a data set group including a plurality of the data sets, thereby generating an image transformer that transforms a composite image into a real image; (6) generating a labeled real image as a result of the image transformer transforming the composite image into the real image; and (7) training the recognizer based on the labeled real image.

In the aforementioned machine learning system, the image transformer may be a machine learning model that uses the real image as a first domain and the composite image as a second domain and is able to transform between the first domain and the second domain.

In the aforementioned machine learning system, the recognizer may be re-learned by repeating processing of (2)-(6) until the recognizer reaches a desired performance.

In the aforementioned machine learning system, a composite image generator capable of generating a composite image by changing the position and the posture of the object may be used in (4), and the composite image generator may generate a composite image of the object in such a way that the position and the posture of the composite image match the position and the posture obtained in the results of the recognition in (2).

In the aforementioned machine learning system, in (1), a composite image generated by the composite image generator may be used.

In the aforementioned machine learning system, in (6), a composite image of an object in a position and a posture that are different from the position and the posture that have been recognized when the captured image is input to the recognizer as a labeled real image may be transformed into a real image.

In the aforementioned machine learning method, the label of the captured image may show the number of objects or the number of objects for each category of objects.

A computer readable medium according to this embodiment is a computer readable medium storing a program for causing a computer to execute a machine learning method, in which the machine learning method performs the following processing of: (1) training a recognizer that recognizes object information including a position and a posture of an object using a composite image of the object; (2) acquiring a labeled real image based on a captured image of the object captured by an image sensor; (3) storing, when at least of results of the recognition when the labeled real image is input to the recognizer match the label, the real image and the results of the recognition performed by the recognizer; (4) generating a composite image using the results of the recognition performed by the recognizer, thereby generating a data set in which the real image and the composite image form a pair; (5) performing machine learning using a data set group including a plurality of the data sets, thereby generating an image transformer that transforms a composite image into a real image; (6) generating a labeled real image as a result of the image transformer transforming the composite image into the real image; and (7) training the recognizer based on the labeled real image.

According to the present disclosure, a machine learning method, a machine learning system, and a program capable of generating a highly accurate recognizer in a simple manner are provided.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a diagram for describing domain transformation by an image transformer;

FIG. 4 is a flowchart showing a learning method according to this embodiment.

DESCRIPTION OF EMBODIMENTS

Hereinafter, the present disclosure will be explained with reference to embodiments of the present disclosure. However, the disclosure set forth in the claims is not limited to the following embodiments. Further, not all the structures explained in the embodiments may be necessary as means for solving the problem.

Figure 1:
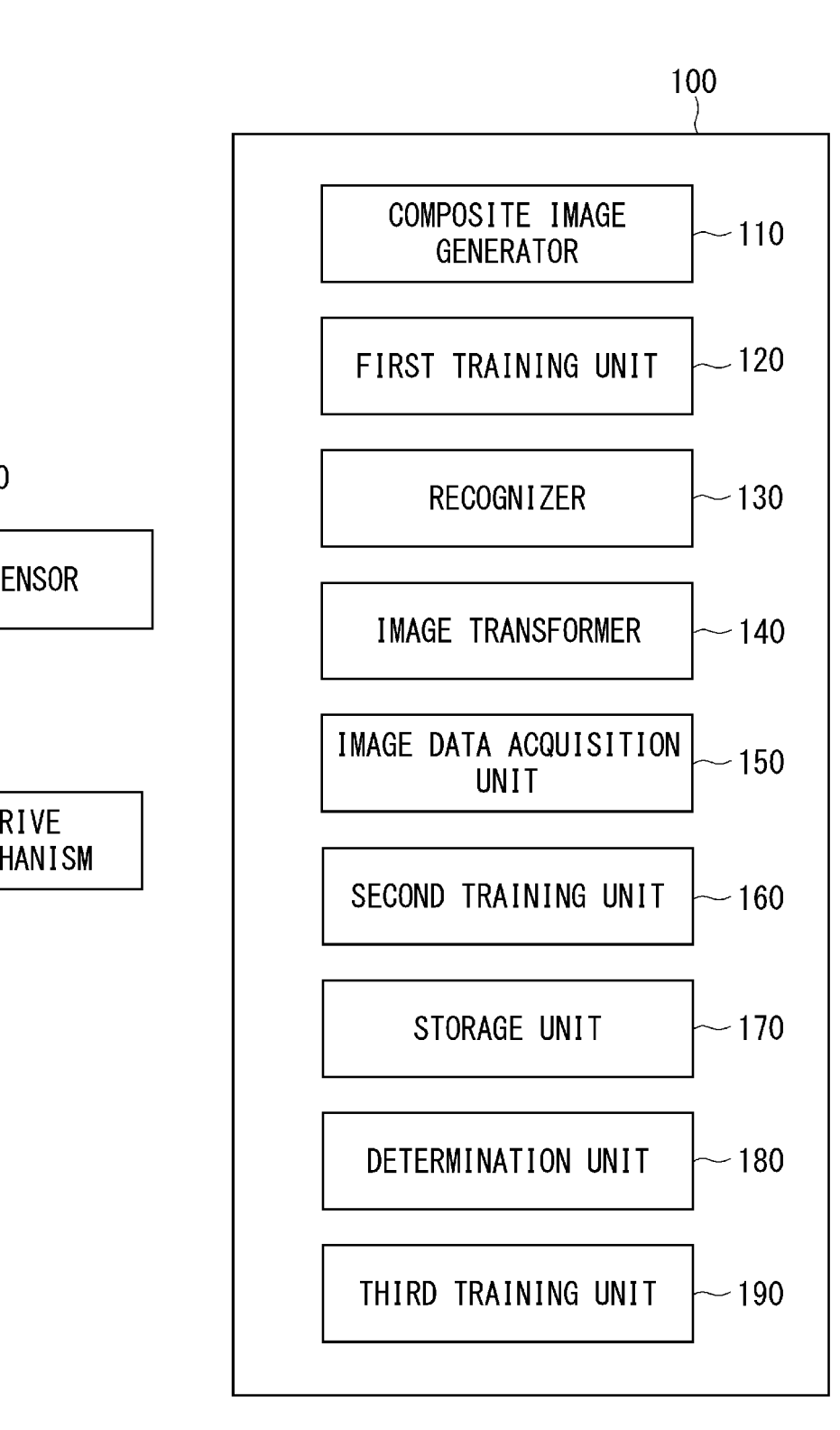
FIG. 1 is a block diagram schematically showing a system configuration.

With reference to the drawings, a machine learning system and a method according to this embodiment will be described. FIG. 1 is a block diagram showing a configuration of a system 1. The system 1 includes a processing apparatus 100, a sensor 200, and a drive mechanism 300.

The learning system 1 is a system for generating a recognizer 130 by machine learning (the machine learning will be simply referred to as learning). The recognizer 130 recognizes information on categories of objects, the number of objects, the positions and the postures of the objects or the like based on images obtained by capturing the objects. That is, the recognizer 130 outputs results of the recognition using the captured images of the objects as input data. The results of the recognition performed by the recognizer 130 are, for example, the information on the categories of the respective objects, number information, and position/posture information of the respective objects. The results of recognizing the objects are information serving as labels that will be described later. The recognizer 130 is a machine learning model generated by a machine learning method such as deep learning.

Figure 2:
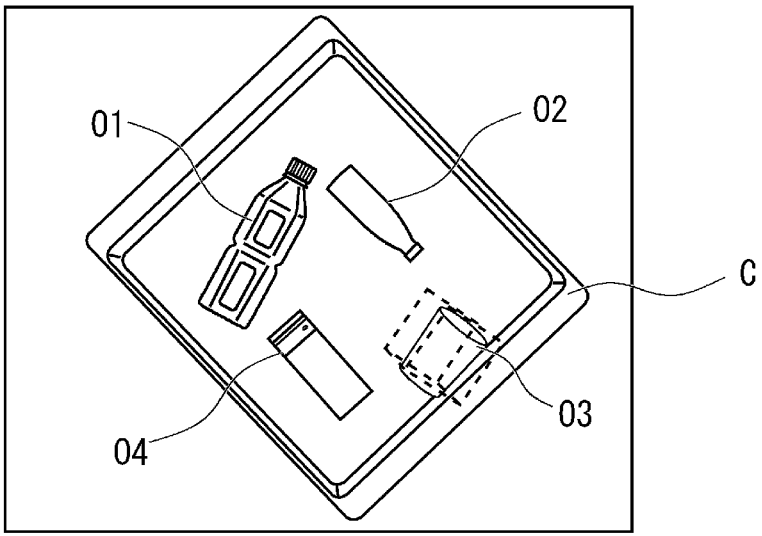
FIG. 2 is a diagram schematically showing one example of a captured image.

The information on the categories of the respective objects is information indicating, for example, names of the objects or types of the objects. In this embodiment, as shown in FIG. 2, a plastic bottle, a glass container (bottle) for beverage, a container for instant noodle, and a box-shaped paper container (paper pack) for beverage are used as objects O1 to O4. The information on the categories of the respective objects is information indicating the names and the like of the respective objects. For example, the information on the category of the object O1 is, for example, a plastic bottle indicating the name of the object.

The recognizer 130 recognizes the information on the categories of the respective objects in the captured images. Further, the recognizer 130 recognizes the number of objects O1 to O4 included in the captured images. For example, the recognizer 130 may recognize the number of objects for each category. The recognizer 130 recognizes the positions and the postures of the respective objects O1 to O4. Note that the position and the posture are, for example, information for six degrees of freedom indicating XYZ three-dimensional coordinates, a roll angle, a pitch angle, and a yaw angle. The recognizer 130 outputs results of recognizing the objects included in the captured images.

The sensor 200 is a measurement device for measuring an object. The sensor 200 is an image sensor or a camera and captures images of objects. For example, the sensor 200 may be an optical sensor such as a Charge Coupled Device (CCD) camera or a Complementary Metal Oxide Semiconductor (CMOS) image sensor. Specifically, the sensor 200 is a visible light camera which detects visible light. Further, the sensor 200 is a RGB camera having RGB pixels and captures color images. The sensor 200 outputs the captured images to the processing apparatus 100.

FIG. 2 shows one example of the images. The real image in FIG. 2 shows one example of the captured images. In this example, the sensor 200 is imaging a case C that accommodates objects from above. The four objects O1 to O4 are accommodated in the case C.

The drive mechanism 300 includes an actuator for changing the positions and the postures of the objects with respect to the sensor 200. The drive mechanism 300 includes, for example, a swinging mechanism that swings the case C. The drive mechanism 300 swings the case C, thereby changing the positions and the postures of the objects O1 to O4. The drive mechanism 300 is not limited to the swinging mechanism that swings the case C. For example, the drive mechanism 300 may be a robot arm or the like that grasps or adsorbs an object. Alternatively, the drive mechanism 300 may be a turn table or the like. The drive mechanism 300 may further be the one that changes the position and the posture of the sensor 200. That is, the drive mechanism 300 may have any configuration as long as it can change the relative position and posture of an object with respect to the sensor 200.

The sensor 200 captures a plurality of images of objects. For example, the sensor 200 captures the objects before and after the drive mechanism 300 changes the positions and the postures of the objects. The positions and the postures of the objects with respect to the sensor 200 in one captured image are different from those in another captured image. Alternatively, the sensor 200 may capture the images by changing the number of objects or their categories. For example, in FIG. 2, an object in the case C may be replaced by another object. Alternatively, an object may be added in the case C or an object may be removed from the case C. Further, the number of objects may be changed. That is, the sensor 200 captures images inside the case C by changing information items included in labels.

The processing apparatus 100 is an information processing apparatus of a personal computer. The processing apparatus 100 includes, for example, a memory, a processor, various kinds of interface, an input device, an output device, and a monitor. The processor of the processing apparatus 100 executes a program stored in the memory, whereby processing that will be described later is performed. Further, the processing apparatus 100 is an information processing apparatus that can perform communication wirelessly or by a wire.

The processing apparatus 100 includes a composite image generator 110, a first training unit 120, the recognizer 130, an image transformer 140, an image data acquisition unit 150, a second training unit 160, a storage unit 170, and a determination unit 180.

The composite image generator 110 generates a composite image from object data regarding objects. The composite image is a CG image or a rendering image generated from a three-dimensional model or the like of the objects. For example, the three-dimensional model has three-dimensional shape data and RGB data of a surface of each object. The three-dimensional shape data indicates the surface shapes of the objects. The RGB data includes information such as the color, the pattern, and the shade of the surface of each of the objects O1 to O4. In the three-dimensional model, three-dimensional coordinates of the surface shape are associated with the gradation of the RGB data.

The composite image generator 110 generates a composite image using a three-dimensional model of each object. The composite image generator 110 is, for example, a renderer that performs rendering using data of the three-dimensional model. Since the composite image is an image in a simulation domain, the composite image generator 110 is able to generate a number of composite images.

Further, the composite image generator 110 is able to automatically perform labeling on the composite image. That is, the composite image generator 110 is able to add information such as position/posture information of the objects, the category information, or the number information in the composite image to the composite image as labels. It is sufficient that the composite image be an image including one or more objects.

The composite image generator 110 generates a plurality of composite images by changing information items included in the label. For example, by changing at least one of the number of objects, the categories of the objects, and the positions and the postures of the objects in the case, composite images different from each other are generated.

The composite image generator 110 is able to generate a number of composite images by randomly changing the position/posture information, the category information, the number information or the like. The composite image generator 110 is able to generate the composite images by changing the positions and the postures of the objects. The composite image generator 110 is able to generate the composite images by changing the number of objects. Further, the composite image generator 110 is able to generate the composite images by changing the categories of the respective objects.

The labels may be information output as the results of the recognition performed by the recognizer 130. Alternatively, the labels may be information that is required to generate the composite images. That is, the composite image generator 110 is able to generate the composite images based on the information that has been given as labels. Then, by changing at least one of the number information, the category information, and the position/posture information, composite images different from each other are generated.

The first training unit 120 trains the recognizer 130 using the composite images as learning data. The category information, the number information, the position/posture information or the like is added to the composite images as labels. That is, the first training unit 120 performs supervised learning using the category information, the number information, the position/posture information or the like added to the composite images as teaching data (this data is also referred to as a ground-truth label or ground-truth data). In this manner, the first training unit 120 performs machine learning of the recognizer 130. In the first training unit 120, only the composite images are used as the learning data. That is, the first training unit 120 performs machine learning without using the captured images. Accordingly, parameters of the machine learning models are updated. That is, parameters are tuned so as to optimize the network.

The image data acquisition unit 150 acquires image data of the images captured by the sensor 200. The drive mechanism 300 changes the positions and the postures of the objects. Accordingly, the image data acquisition unit 150 acquires image data of a plurality of captured images in which positions and postures are different from one another. The image data acquisition unit 150 acquires the labeled real images based on the images of the objects captured by the sensor 200. Alternatively, the image data acquisition unit 150 acquires image data of the captured images of the objects included in the case C in which the categories of the respective objects or the number of objects are different from one another.

The label attached to the captured image (real image) includes one or more of the results of the recognition performed by the recognizer 130. For example, the label on the captured image includes category information and number information. In this example, the categories of the respective objects accommodated in the case C and the number of objects for each category correspond to the label. The category information attached as a label of the real image (captured image) shown in FIG. 2 is a plastic bottle, a glass container (bottle) for beverage, a container for instant noodle, and a box-shaped paper container (paper pack) for beverage, and the number information indicates one for each of the objects.

Further, the label of the captured image does not include position/posture information. Since the label of the captured image may be only a part of the information included in the results of the recognition, the cost for labeling can be reduced. For example, the label of the captured image may be only the information on the number of objects. The label of the captured image may be only the information used for a determination made in the determination unit 180 that will be described later.

The recognizer 130 performs recognition processing on the captured images acquired by the image data acquisition unit 150. That is, the recognizer 130 performs recognition processing upon receiving image data of the images captured by the sensor 200. Accordingly, the recognizer 130 infers the category information, the number information, and the position/posture information of the objects included in the captured image. The recognizer 130 outputs the results of the recognition including the category information, the number information, and the position/posture information of the objects to the determination unit 180.

The determination unit 180 determines whether at least one of the results of the recognition performed by the recognizer 130 match the label of the captured image. The determination unit 180 determines whether or not the number information in the results of the recognition matches information on the number of objects included as the label of the captured image. The determination unit 180 may include at least one of the categories of the respective objects, the types of the objects, the number of objects for each category, the number of objects for each category of objects, the total number of objects and the like. The user is able to define one or more information items used for the determination in the determination unit 180 in advance. For example, the determination unit 180 determines, for both the categories of the respective objects and the number of objects for each category, whether or not the label matches the results of the recognition. Alternatively, the determination unit 180 determines, for the categories of the respective objects, whether or not the label matches the results of the recognition.

When the results of the recognition match the label, the storage unit 170 stores a captured image (real image). When the results of the recognition match the label, the storage unit 170 stores the results of the recognition. The captured image in which the results of the recognition match the label becomes a real image that is used for machine learning in the second training unit 160 that will be described later. The storage unit 170 stores the results of the recognition including the position/posture information in association with the captured image. When at least one of the results of the recognition when the labeled real image is input into the recognizer 130 match the label, the storage unit 170 stores the real image and the results of the recognition performed by the recognizer. The storage unit 170 stores all the information items of the results of the recognition. When at least some of the results of the recognition match the label, the storage unit 170 stores the results of the recognition that do not match the label as well. Therefore, the storage unit 170 stores the position/posture information, the number information, and the category information in association with the real image.

When the results of the recognition do not match the label, the storage unit 170 does not store a captured image. That is, a captured image in which the results of the recognition do not match the label at all is not used for machine learning in the second training unit 160 that will be described later.

Next, the composite image generator 110 generates a composite image based on the results of the recognition stored in the storage unit 170. That is, the composite image generator 110 generates a composite image that corresponds to the position/posture information, the category information, and the number information included in the results of the recognition. Accordingly, a data set in which a composite image and a real image form a pair is generated. Since the composite image generator 110 generates a composite image in accordance with the results of the recognition, a composite image that is in a state close to the state of the real image is included in the data set. In this manner, the composite image generator 110 is able to generate a data set in which a real image in a real domain (first domain) and a composite image in a simulation domain (second domain) form a pair. The composite image generator 110 generates a plurality of data sets using a plurality of captured images (real images) and the results of the recognition.

The second training unit 160 generates the image transformer 140 for transforming composite images into real images by performing machine learning using a data set group including the plurality of the data sets. As shown in FIG. 2, the image transformer 140 performs domain transformation of an image in the simulation domain into an image in the real domain. That is, the image transformer 140 is able to generate a real image that is closer to the captured image than the composite image is. The second training unit 160 generates the image transformer 140 using a machine learning method such as deep learning. Accordingly, parameters of the network of the machine learning model, which is the image transformer 140, are updated. That is, parameters are tuned so as to optimize the network.

As shown in FIG. 3, the image transformer 140 is preferably a machine learning model capable of performing transformation between the simulation domain and the real domain. The upper part of FIG. 3 shows a real image, which is the real domain, and the lower part of FIG. 3 shows a composite image, which is the simulation domain. The composite image corresponds to an image generated in the composite image generator 110. The image transformer 140 receives a composite image in the simulation domain and outputs a real image in the real domain. The image transformer 140 may instead receive the real image in the real domain and outputs the composite image in the simulation domain.

By using the machine learning model capable of performing transformation between the simulation domain and the real domain, the second training unit 160 is able to generate a highly accurate machine learning model. For example, the second training unit 160 trains a neural network that transforms a real image in the real domain into a composite image in the simulation domain and a neural network that transforms a composite image in the simulation domain into a real image in the real domain alternately and repeatedly. The second training unit 160 is able to construct a highly accurate machine learning model. Since the training can be efficiently performed, it becomes possible to generate a real image that is closer to the captured image.

CycleGAN or DRIT shown below may be, for example, used as the image transformer 140 capable of performing transformation between the simulation domain and the real domain.

Unpaired Image-to-Image Translation using Cycle-Consistent Adversarial Networks (https://junyanz.github.io/CycleGAN/)

DRIT++: Diverse Image-to-Image Translation via Disentangled Representations (https://arxiv.org/abs/1905.01270)

Next, the image transformer 140 transforms a composite image into a real image, thereby generating a labeled real image. Specifically, the composite image generator 110 generates a composite image of an object with a desired label. The composite image generator 110 generates a composite image of a desired category, a desired number of objects, and desired position and posture. The label here may be randomly generated. That is, the composite image generator 110 is able to generate a composite image by randomly changing the position/posture information, the category information, and the number information.

Then, the image transformer 140 performs domain transformation of the composite image of the object. Accordingly, it is possible to generate a labeled real image. The label here is the position/posture information, the category information, and the number information used to generate the composite image in the composite image generator 110. Accordingly, it is possible to efficiently generate the labeled real image. That is, it is possible to generate the labeled real image without using the images captured by the sensor 200. Accordingly, it is possible to generate a number of labeled real images.

A third training unit 190 trains the recognizer 130 based on the labeled real image. That is, the third training unit 190 performs machine learning using the labeled real image as the learning data. Accordingly, the parameters of the network of the machine learning model are updated. That is, the parameters are tuned so as to optimize the network.

It is therefore possible to improve the accuracy of the recognition in the recognizer 130. That is, since a real image that is closer to the captured image can be used as a learning image, the highly accurate recognizer 130 can be formed in a simple manner. In this example, it is possible to perform supervised learning that uses the label attached to the real image as teaching data. Accordingly, it is possible to further improve the accuracy of the recognition in the recognizer 130.

The processing apparatus 100 is able to repeat the aforementioned processing until the accuracy of the recognition in the recognizer 130 reaches a desired performance. That is, the second training unit 160, the third training unit 190 and the like repeatedly perform training until the results of the recognition satisfy the accuracy of a preset criterion. Accordingly, parameters of the network of the machine learning model are updated. That is, parameters are tuned so as to optimize the network.

According to the aforementioned configuration, it is possible to acquire learning data more efficiently and efficiently generate the recognizer 130. It is possible to reduce the cost for collecting the learning data. The images captured by the sensor 200 are able to further reduce the cost for labeling. That is, the image transformer 140 generates a labeled real image based on the composite image. Accordingly, it is possible to easily generate a number of labeled real images.

It becomes possible to generate labeled real images even without controlling the position and the posture using a drive mechanism having a high accuracy such as a robot. That is, since there is no need to control the position and the posture of the object, it is possible to reduce the cost for collecting the learning data. Since it is sufficient that the label of the captured image be a partial information, the cost for labeling can be reduced. For example, only the category information or the number information of the objects may be attached to the captured image.

Since the image transformer 140 is generated using the real image in which the results of the recognition in the recognizer 130 match the label, it is possible to generate the image transformer 140 with a high accuracy. Since the composite image generator 110 and the image transformer 140 are used, it is possible to reduce the cost (operation time) for acquiring the images in various positions and postures. Since the real image transformed in the image transformer

140 is a labeled image, it is possible to easily generate a large number of labeled real images.

With reference to FIG. 4, a method according to this embodiment will be described. FIG. 4 is a flowchart showing a learning method.

First, the processing apparatus 100 performs training of the recognizer 130 using a composite image of an object (S101). For example, the composite image generator 110 generates a composite image of the object. In this example, the composite image generator 110 generates a plurality of composite images for an object in any position and posture. The composite image generator 110 generates a plurality of composite images in which information items on the labels are different from one another. The composite images may be, for example, Computer Graphics (CG) images or may be rendering images obtained from three-dimensional data of the object. The composite image generator 110 is able to automatically add labels. Since the composite images are images in the simulation domain, the composite image generator 110 is able to automatically perform labeling. Then, the first training unit 120 trains the recognizer 130 that recognizes object information including positions and postures of the object using the composite images of the object.

Next, the processing apparatus 100 acquires the labeled real images (S102). For example, the sensor 200 captures the case C that accommodates the object. Further, the drive mechanism 300 changes the position and the posture of the object. In this manner, the sensor 200 is able to capture images in various positions and postures. It is also possible to change the categories of the respective objects and the number of objects included in the case C. Accordingly, the sensor 200 is able to capture images of various objects. Then, the image data acquisition unit 150 acquires the images captured from the sensor 200. The image data acquisition unit 150 acquires the captured images to which partial information is added as labels as real images.

The processing apparatus 100 stores results of the recognition and a real image that match the label (S103). Specifically, the processing apparatus 100 inputs the captured images into the recognizer 130, which causes the recognizer 130 to output the results of the recognition. The recognizer 130 outputs the results of the recognition including the categories of the respective objects, the number of objects, the position and the posture of the objects. The determination unit 180 compares the information items included in the label (ground-truth data) with the results of the recognition. The determination unit 180 then determines whether or not at least one of the information items included in the label matches the results of the recognition.

When at least one of the results of the recognition matches the label, the processing apparatus 100 stores the captured image in the storage unit 170. The storage unit 170 stores the captured image in association with the results of the recognition. The storage unit 170 stores the captured image as the real image. That is, the real image stored in the storage unit 170 is associated with the results of the recognition including the categories of the respective objects, the number of objects for each object (for each category of objects), and the position and the posture. The storage unit 170 stores the plurality of captured images in association with the results of the recognition.

The processing apparatus 100 generates the composite image using the results of the recognition performed by the recognizer 130, thereby generating a data set in which a real image and a composite image form a pair (S104). In this example, the composite image generator 110 generates the composite image based on the results of the recognition output in Step S103. The composite image generator 110 generates the composite image upon receiving a label attached to the real image. The composite image generator 110 generates a composite image that corresponds to the category of the object, the number of objects, the position and the posture included in the results of the recognition of the captured image. The composite image thus generated forms a pair with the real image. The storage unit 170 stores a data set in which a composite image and a real image form a pair. Since the results of the recognition for a plurality of real images are required in Step S103, the storage unit 170 stores a plurality of data sets. All the information items included in the label of the real image and the composite image, which form a data set, completely match.

The processing apparatus 100 performs machine learning using a data set group including a plurality of the data sets, thereby generating the image transformer 140 for transforming the composite image into a real image (S105). For example, the second training unit 160 performs supervised learning using the real image as a ground-truth label using the composite image as input data. The second training unit 160 generates a machine learning model for transforming the composite image into a real image as the image transformer 140. A known machine learning model such as Deep Neural Network (DNN) or Convolutional Neural Network (CNN) may be used as the image transformer 140.

The composite image generator 110 transforms the composite images into real images, thereby generating labeled real images (S106). Therefore, the composite image generator 110 generates composite images in various states. Then, the image transformer 140 transforms the composite images into real images that are similar to the captured image. The composite image generator 110 is able to use data that is different from the data of the labels used in S101. S103, and S104. That is, the composite image generator 110 may generate composite images in states that are different from those of the real images or the composite images used in S101, S103, and S104. The composite image generator 110 generates a composite image using a label of new data. In this manner, it is possible to generate real images in various states.

The composite image generator 110 trains the recognizer 130 based on the labeled real images (S107). That is, the third training unit 190 trains the recognizer 130 using the labeled real images generated in S106 as learning data. In this manner, it is possible to improve the accuracy of the recognition in the recognizer 130.

The processing apparatus 100 determines whether or not the learning has ended (S108). When the learning has not ended (NO in S108), the processing returns to Step S102, where the recognizer 130 is re-learned. When the learning has ended (YES in S108), the processing is ended.

For example, the processing apparatus 100 determines whether or not the recognizer 130 has reached the desired performance. When the recognizer 130 has not reached the desired performance, the processing apparatus 100 repeats processing of S102-S107. The sensor 200 newly captures an object. Then, the processing apparatus 100 performs machine learning based on the captured image that has been newly acquired. Accordingly, parameters of the recognizer 130 and the image transformer 140 are updated. Accordingly, the processing apparatus 100 tunes the parameters so as to optimize the network of the recognizer 130 and the image transformer 140. The system 1 re-learns the recognizer 130 and the image transformer 140. In this manner, the processing apparatus 100 is able to generate a recognizer having a desired performance by machine learning. The desired performance may be defined by a user in advance. Alternatively, when the iteration has reached a predetermined number, the system 1 may end the learning.

The second training unit 160 generates the image transformer 140 using a real image in which the results of the recognition in the recognizer 130 match the label. Therefore, it is possible to generate the image transformer 140 with a high accuracy. The real image transformed in the image transformer 140 is a labeled image including information such as the position and the posture, the number of objects, or the category. Accordingly, it is possible to easily generate a large number of labeled real images. In Step S102, captured images, which are real images, can be efficiently acquired.

The composite image generator 110 and the image transformer 140 are trained as machine learning models different from each other. Since the processing apparatus 100 uses the composite image generator 110 and the image transformer 140, it is possible to reduce the cost (operation time) for acquiring images in various positions and postures. Accordingly, it is possible to reduce the number of captured images that are required for machine learning and efficiently acquire sensor data. It is sufficient that the label of the captured image be partial information such as the number of objects. Therefore, it is possible to reduce the cost for labeling.

Figure 5:
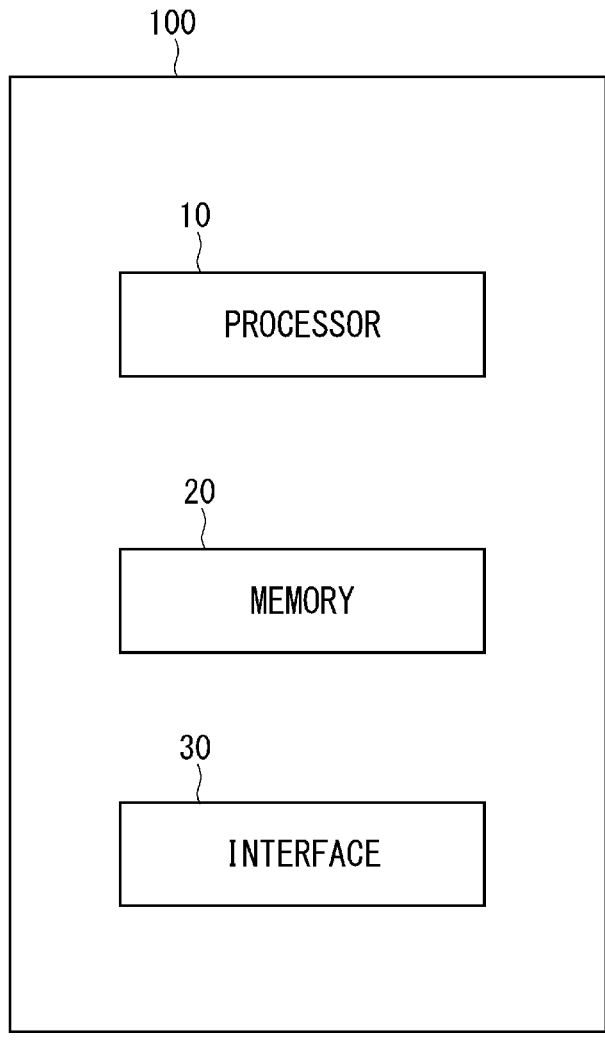
FIG. 5 is a block diagram showing a hardware configuration of a processing apparatus.

The aforementioned learning method may be executed by a computer program or hardware. That is, the processing apparatus 100 executes a predetermined program, thereby functioning as a learning apparatus or a learning system. FIG. 5 shows one example of a hardware configuration of the processing apparatus 100. The processing apparatus 100 includes a processor 10, a memory 20, an interface 30 and the like. The memory 20 stores a program, various kinds of parameters, machine learning models and the like. The processor 10 executes the program stored in the memory 20. The interface 30 transmits data to the sensor 200 and the drive mechanism 300. Further, the interface 30 receives data from the sensor 200 and the drive mechanism 300.

The processor 10 of the processing apparatus 100 executes the program, thereby being able to execute the learning method according to this embodiment. It is sufficient that the processing apparatus 100 include at least one processor 10. The aforementioned processing is performed by one or more processors 10 executing the program stored in the memory. The processing apparatus 100 is not limited to a single physical apparatus and may be distributed in a plurality of apparatus. That is, the aforementioned method may be executed by a plurality of apparatuses performing distributed processing.

A variety of methods using Artificial Intelligence (AI) can be applied to form the machine learning models such as the recognizer 130 and the image transformer 140. Deep learning using multi-layer neural networks may be applied to machine learning. Machine learning methods that may be employed may be any known method such as supervised learning, unsupervised learning, semi-supervised learning, or reinforcement learning. The system 1 can use a model that uses perceptron, neocognitron, or connectionism. The system 1 may form a network model such as a CNN, a recurrent neural network (RNN), or a Long Short Term Memory (LSTM) network. An activation function of the neural network may be a sigmoid function, a Softmax function, a step function, a linear function, a nonlinear function, or an identity function.

Machine learning using back propagation (error back propagation) can be applied. Known learning methods such as representation learning, transfer learning, ensemble learning, or self-learning may be used. The system 1 may use Generative adversarial networks, genetic algorithms, and autoencoders. As a matter of course, the system 1 is not limited to the aforementioned methods and may be a variety of methods.

A part or the whole of the above-described processing may be executed by the computer program. That is, a control computer that forms the processing apparatus 100 executes the program, whereby control of the aforementioned processing apparatus 100 is executed. The aforementioned program includes instructions (or software codes) that, when loaded into a computer, cause the computer to perform one or more of the functions described in the embodiment.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A machine learning method performed by at least one processor, the method comprising:

training, by the at least one processor, a recognizer that recognizes object information including a position and a posture of an object using a first composite image of the object;

acquiring, by the at least one processor, a first labeled real image based on a captured image of the object captured by an image sensor;

storing, by the at least one processor in a non-transitory memory when the recognizer outputs recognition results indicating that a first real image captured by the image sensors matches the label, the first real image and the recognition results;

generating, by the at least one processor, a second composite image using the recognition results, thereby generating a data set in which the first real image and the second composite image form a pair, the second composite image corresponding to a computer graphics (CG) image based on a three-dimensional model of the object;

performing, by the at least one processor, machine learning using a data set group including a plurality of the data sets, thereby generating an image transformer that transforms the second composite image into a second real image;

generating, by the at least one processor a second labeled real image as a result of the image transformer transforming the second composite image into the second real image; and training, by the at least one processor, the recognizer based on the second labeled real image.

2. The machine learning method according to claim 1, wherein the image transformer is a machine learning model that uses the first real image as a first domain and the second composite image as a second domain to transform between the first domain and the second domain.

3. The machine learning method according to claim 1, further comprising re-training the recognizer by repeating processing of:

training, by the at least one processor, the recognizer that recognizes object information including a position and a posture of an object using a composite image of the object;

acquiring, by the at least one processor, a labeled real image based on a captured image of the object captured by an image sensor;

storing, by the at least one processor in the non-transitory memory, when at least one of results of the recognition when the labeled real image is input to the recognizer match the label, the real image and the results of the recognition performed by the recognizer;

generating, by the at least one processor, a composite image using the results of the recognition performed by the recognizer, thereby generating a data set in which the real image and the composite image form a pair;

performing, by the at least one processor, machine learning using a data set group including a plurality of the data sets, thereby generating an image transformer that transforms a composite image into a real image; and generating, by the at least one processor, a labeled real image as a result of the image transformer transforming the composite image into the real image; until the recognizer reaches a desired performance.

4. The machine learning method according to claim 1, wherein a composite image generator configured to generate the second composite image by changing the position and the posture of the object is used in generating the second composite image using the results of the recognition performed by the recognizer, thereby generating the data set in which the first real image and the second composite image form a pair, and the composite image generator is further configured to generate the second composite image of the object in such a way that the position and the posture of the composite image match the position and the posture obtained in the results of the recognition in acquiring the first labeled real image based on a captured image of the object captured by an image sensor.

5. The machine learning method according to claim 4, wherein, in training the recognizer that recognizes object information including a position and a posture of the object using first composite image of the object, the second composite image generated by the composite image generator is used.

6. The machine learning method according to claim 1, wherein, in generating the second labeled real image as a result of the image transformer transforming the second composite image into the second real image, a composite image of an object in a position and a posture that are different from the position and the posture that have been recognized when the captured image is input to the recognizer as a labeled real image is transformed into a real image.

7. The machine learning method according to claim 1, wherein the label of the captured image shows the number of objects or the number of objects for each category of objects.

8. A machine learning system comprising:

a non-transitory memory storing one or more instructions; and at least one processor operatively coupled to the memory, wherein, the one or more instructions, when executed by the processor, cause the machine learning system to train a recognizer that recognizes object information including a position and a posture of an object using a first composite image of the object;

acquire a first labeled real image based on a captured image of the object captured by an image sensor;

store, in the non-transitory memory when the recognizer outputs recognition results indicating that a first real image captured by the image sensors matches the label, the first real image and the recognition results;

generate a second composite image using the recognition results, thereby generating a data set in which the first real image and the second composite image form a pair, the second composite image corresponding to a computer graphics (CG) image based on a three-dimensional model of the object;

perform machine learning using a data set group including a plurality of the data sets, thereby generating an image transformer that transforms the second composite image into a second real image;

generate a second labeled real image as a result of the image transformer transforming the second composite image into the second real image; and train the recognizer based on the second labeled real image.

9. The machine learning system according to claim 8, wherein the image transformer is a machine learning model that uses the first real image as a first domain and the second composite image as a second domain to transform between the first domain and the second domain.

10. The machine learning system according to claim 8, wherein the one or more instructions, when executed by the at least one processor, further cause the machine learning system to retrain the recognizer by repeating processing of:

acquiring a labeled real image based on a captured image of the object captured by an image sensor;

storing, when at least one of results of the recognition when the labeled real image is input to the recognizer match the label, the real image and the results of the recognition performed by the recognizer;

generating a composite image using the results of the recognition performed by the recognizer, thereby generating a data set in which the real image and the composite image form a pair;

performing machine learning using a data set group including a plurality of the data sets, thereby generating an image transformer that transforms a composite image into a real image; and generating a labeled real image as a result of the image transformer transforming the composite image into the real image until the recognizer reaches a desired performance.

11. The machine learning system according to claim 8, wherein a composite image generator configured to generate the second composite image by changing the position and the posture of the object is used in generating the second image using the results of the recognition performed by the recognizer, thereby generating the data set in which the first real image and the second composite image form a pair, and the composite image generator is further configured to generate the second composite image of the object in such a way that the position and the posture of the composite image match the position and the posture obtained in the results of the recognition in acquiring the first labeled real image based on a captured image of the object captured by an image sensor.

12. The machine learning system according to claim 11, wherein, in training the recognizer that recognizes object information including a position and a posture of the object using the first composite image of the object, the second composite image generated by the composite image generator is used.

13. The machine learning system according to claim 8, wherein, in generating second labeled real image as a result of the image transformer transforming the second composite image into the second real image, a composite image of an object in a position and a posture that are different from the position and the posture that have been recognized when the captured image is input to the recognizer as a labeled real image is transformed into a real image.

14. The machine learning system according to claim 8, wherein the label of the captured image shows the number of objects or the number of objects for each category of objects.

15. A non-transitory computer readable medium having instructions stored therein, which when executed by a processor in a machine learning system cause the processor to execute a method comprising:

training a recognizer that recognizes object information including a position and a posture of an object using a first composite image of the object;

acquiring a first labeled real image based on a captured image of the object captured by an image sensor;

storing, in the non-transitory memory when the recognizer outputs recognition results indicating that a first real image captured by the image sensors matches the label, the first real image and the recognition results;

generating a second composite image using the recognition results, thereby generating a data set in which the first real image and the second composite image form a pair, the second composite image corresponding to a computer graphics (CG) image based on a three-dimensional model of the object;

performing machine learning using a data set group including a plurality of the data sets, thereby generating an image transformer that transforms the second composite image into a second real image;

generating a second labeled real image as a result of the image transformer transforming the second composite image into the second real image; and training the recognizer based on the second labeled real image.

\* \* \* \* \*